(12) United States Patent
Haglund

(10) Patent No.: US 7,621,364 B2
(45) Date of Patent: Nov. 24, 2009

(54) SAFETY ARRANGEMENT

(75) Inventor: Lennart Haglund, Vårgårda (SE)

(73) Assignee: Autoliv Development AB, Vargarda (SE)

( * ) Notice: Subject to any disclaimer, the term of this patent is extended or adjusted under 35 U.S.C. 154(b) by 361 days.

(21) Appl. No.: 10/537,278

(22) PCT Filed: Nov. 26, 2003

(86) PCT No.: PCT/SE03/01823

§ 371 (c)(1),
(2), (4) Date: Dec. 27, 2005

(87) PCT Pub. No.: WO2004/048159

PCT Pub. Date: Jun. 10, 2004

(65) Prior Publication Data

US 2006/0118348 A1    Jun. 8, 2006

(30) Foreign Application Priority Data

Nov. 28, 2002    (GB)    .................................. 0227809.1

(51) Int. Cl.
*B60K 28/00* (2006.01)
(52) U.S. Cl. ....................................................... 180/274
(58) Field of Classification Search ................. 180/274, 180/69.2, 69.21, 271; 296/189, 194, 203.2
See application file for complete search history.

(56) References Cited

U.S. PATENT DOCUMENTS

| | | | |
|---|---|---|---|
| 3,792,889 A | 2/1974 | Fuener et al. | |
| 4,249,632 A | 2/1981 | Lucchini et al. | |
| 4,518,183 A | 5/1985 | Lee | |
| 4,792,127 A * | 12/1988 | Körtgen | .................. 267/64.15 |
| 4,932,697 A | 6/1990 | Hun | |
| 4,944,540 A | 7/1990 | Mansoor et al. | |
| 4,961,605 A | 10/1990 | Cawthorn et al. | |
| 5,033,569 A | 7/1991 | Hayes | |
| 5,042,858 A | 8/1991 | Schubert et al. | |
| 5,042,859 A | 8/1991 | Zhang et al. | |
| 5,096,242 A | 3/1992 | Chin-Hun | |
| 5,106,137 A | 4/1992 | Curtis | |
| 5,285,877 A | 2/1994 | Bonenberger et al. | |
| 5,341,724 A | 8/1994 | Vatel | |
| 5,370,429 A | 12/1994 | Reuber et al. | |
| 5,431,460 A | 7/1995 | Hass et al. | |
| 5,456,142 A | 10/1995 | Mosher et al. | |
| 5,613,418 A | 3/1997 | Guido | |
| 5,618,069 A | 4/1997 | Konchan et al. | |
| 5,646,613 A | 7/1997 | Cho | |

(Continued)

FOREIGN PATENT DOCUMENTS

DE        28 41 315        4/1980

(Continued)

*Primary Examiner*—Faye M. Fleming
(74) *Attorney, Agent, or Firm*—Brinks Hofer Gilson & Lione

(57) ABSTRACT

A lifting unit (1) to lift the rear part of a hood or bonnet in the event that an accident should arise comprises an inner cylindrical guide (2) to receive gas from a gas generator and telescopically mounted on the guide, to telescopically interconnected cylindrical piston elements (12, 17). There is a certain degree of play between the telescopically interconnected units to facilitate a virtual pivoting movement of the hood or bonnet to be lifted by the lifting unit.

10 Claims, 7 Drawing Sheets

U.S. PATENT DOCUMENTS

| | | | |
|---|---|---|---|
| 5,725,265 A | 3/1998 | Baber |
| 5,784,943 A | 7/1998 | Kahra |
| 5,785,368 A | 7/1998 | Hartmann et al. |
| 5,810,427 A | 9/1998 | Hartmann et al. |
| 5,853,060 A | 12/1998 | Chao et al. |
| 5,967,573 A | 10/1999 | Wang |
| 6,092,845 A | 7/2000 | Koenig |
| 6,106,033 A | 8/2000 | Rückert |
| 6,174,008 B1 | 1/2001 | Kramer et al. |
| 6,217,108 B1 | 4/2001 | Sasaki |
| 6,224,120 B1 | 5/2001 | Eipper et al. |
| 6,237,992 B1 | 5/2001 | Howard |
| 6,257,657 B1 | 7/2001 | Sasaki |
| 6,293,362 B1 | 9/2001 | Sasaki et al. |
| 6,312,027 B1 | 11/2001 | Yang |
| 6,327,536 B1 | 12/2001 | Tsuji et al. |
| 6,334,639 B1 | 1/2002 | Vives et al. |
| 6,343,821 B2 | 2/2002 | Breed |
| 6,390,529 B1 | 5/2002 | Bingle et al. |
| 6,394,512 B1 | 5/2002 | Schuster et al. |
| 6,401,565 B1 | 6/2002 | Wang et al. |
| 6,415,882 B1 | 7/2002 | Schuster et al. |
| 6,415,883 B1 | 7/2002 | Myrholt et al. |
| 6,439,330 B1 | 8/2002 | Paye |
| 6,447,049 B1 | 9/2002 | Tohda et al. |
| 6,480,103 B1 | 11/2002 | McCarthy et al. |
| 6,485,081 B1 | 11/2002 | Bingle et al. |
| 6,513,617 B2 | 2/2003 | Sasaki et al. |
| 6,516,278 B1 | 2/2003 | Ishizaki et al. |
| 6,571,901 B2 | 6/2003 | Lee |
| 6,588,526 B1 | 7/2003 | Polz et al. |
| 6,621,411 B2 | 9/2003 | McCarthy et al. |
| 6,755,459 B2 | 6/2004 | Thelen et al. |
| 2002/0135196 A1 | 9/2002 | Bingle et al. |
| 2002/0196131 A1 | 12/2002 | McCarthy et al. |
| 2003/0102688 A1 | 6/2003 | Bingle et al. |

FOREIGN PATENT DOCUMENTS

| | | |
|---|---|---|
| DE | 19721565 A1 | 5/1997 |
| DE | 19710417 A1 | 9/1998 |
| DE | 19957872 A | 6/2001 |
| DE | 101 08 882 A1 | 9/2002 |
| DE | 101 16 717 A1 | 10/2002 |
| DE | 102 59 428 A1 | 1/2004 |
| EP | 1 350 693 A1 | 2/2003 |
| GB | 1 541 976 | 3/1979 |
| GB | 2 386 875 A | 10/2003 |
| GB | 2 387 577 A | 10/2003 |
| GB | 2 387 578 | 10/2003 |
| GB | 2 387 581 A | 10/2003 |
| JP | 10 194158 | 7/1998 |
| JP | 11028994 A | 2/1999 |
| JP | 2001-195698 | 7/2001 |
| JP | 2002-37017 A | 2/2002 |
| WO | 96/20852 | 7/1996 |
| WO | WO 02/09983 | 2/2002 |

\* cited by examiner

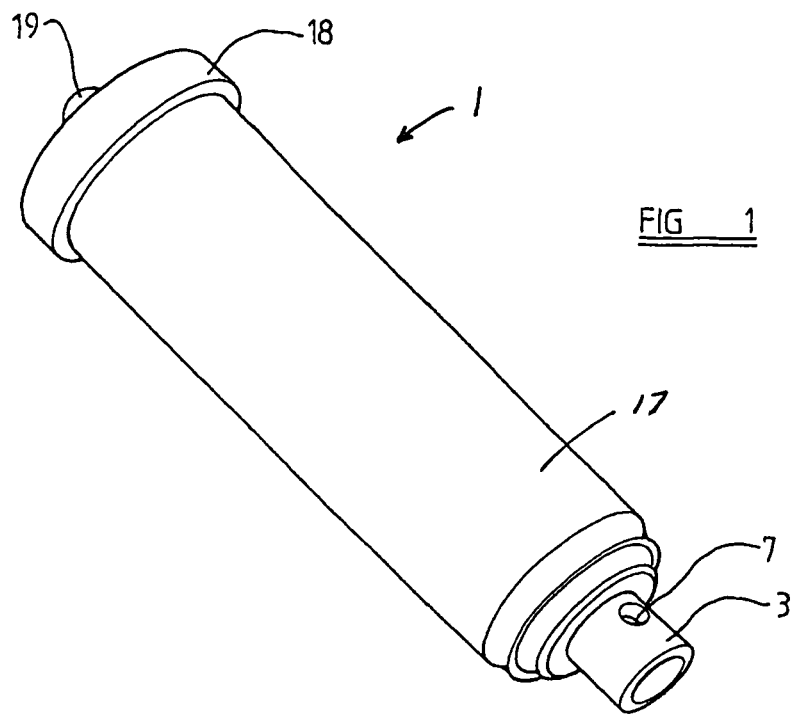
FIG 1
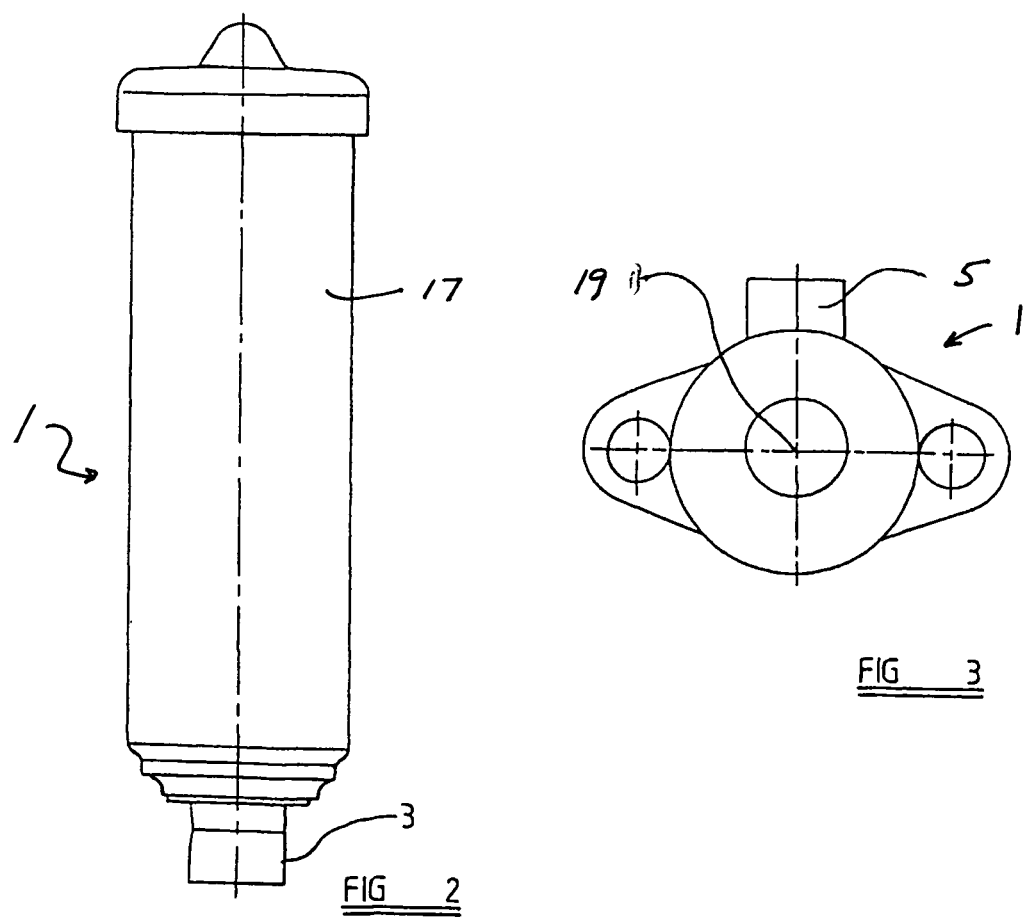
FIG 2
FIG 3

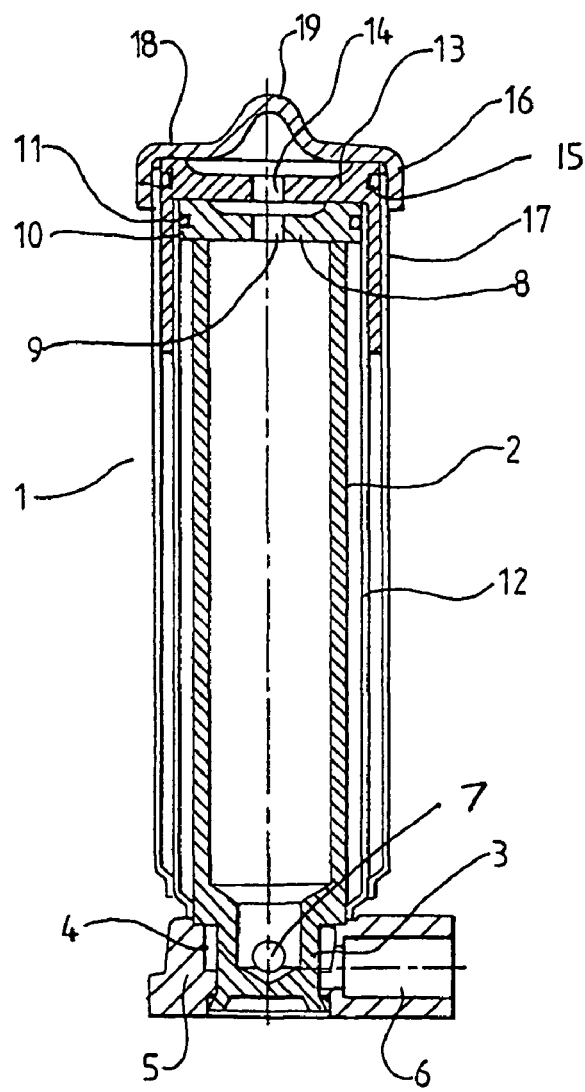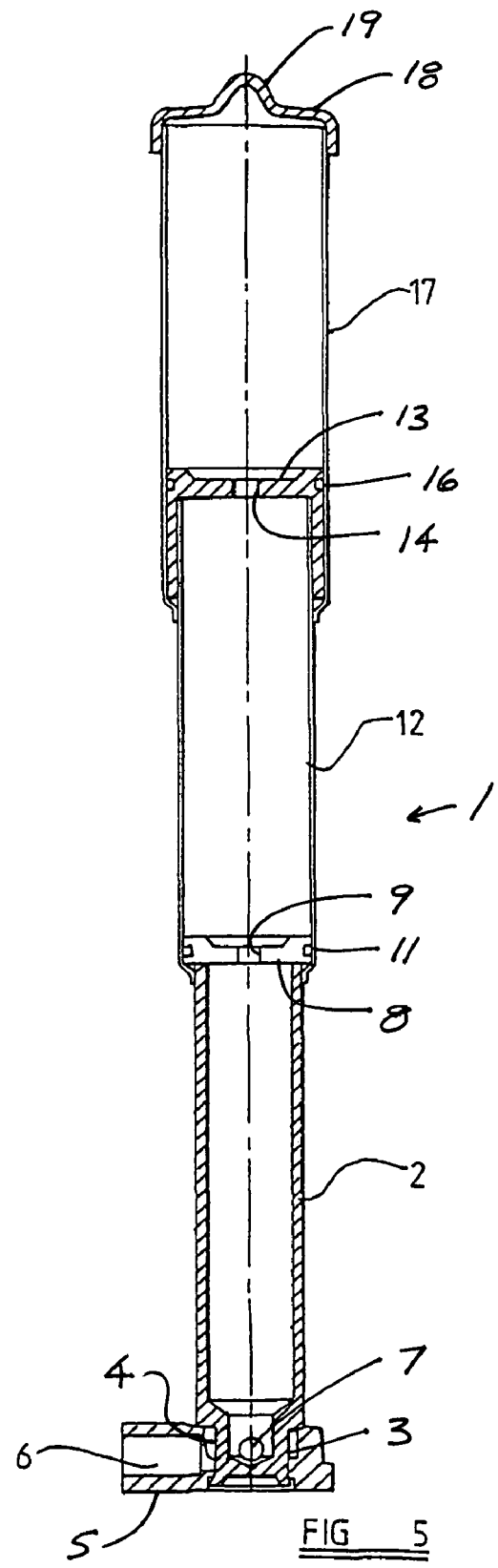

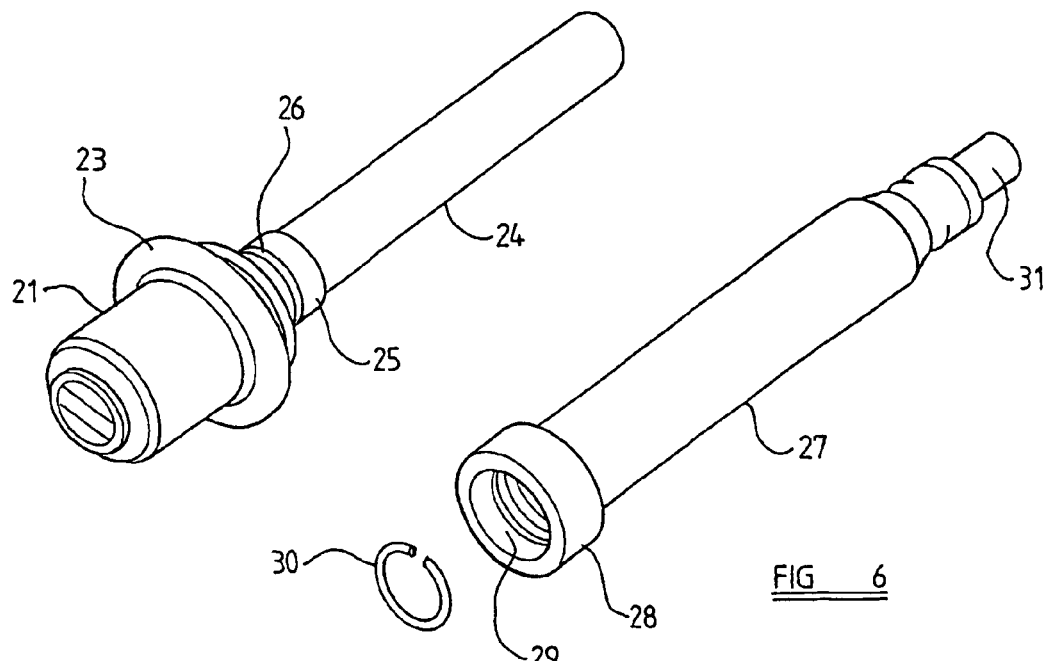
FIG 6
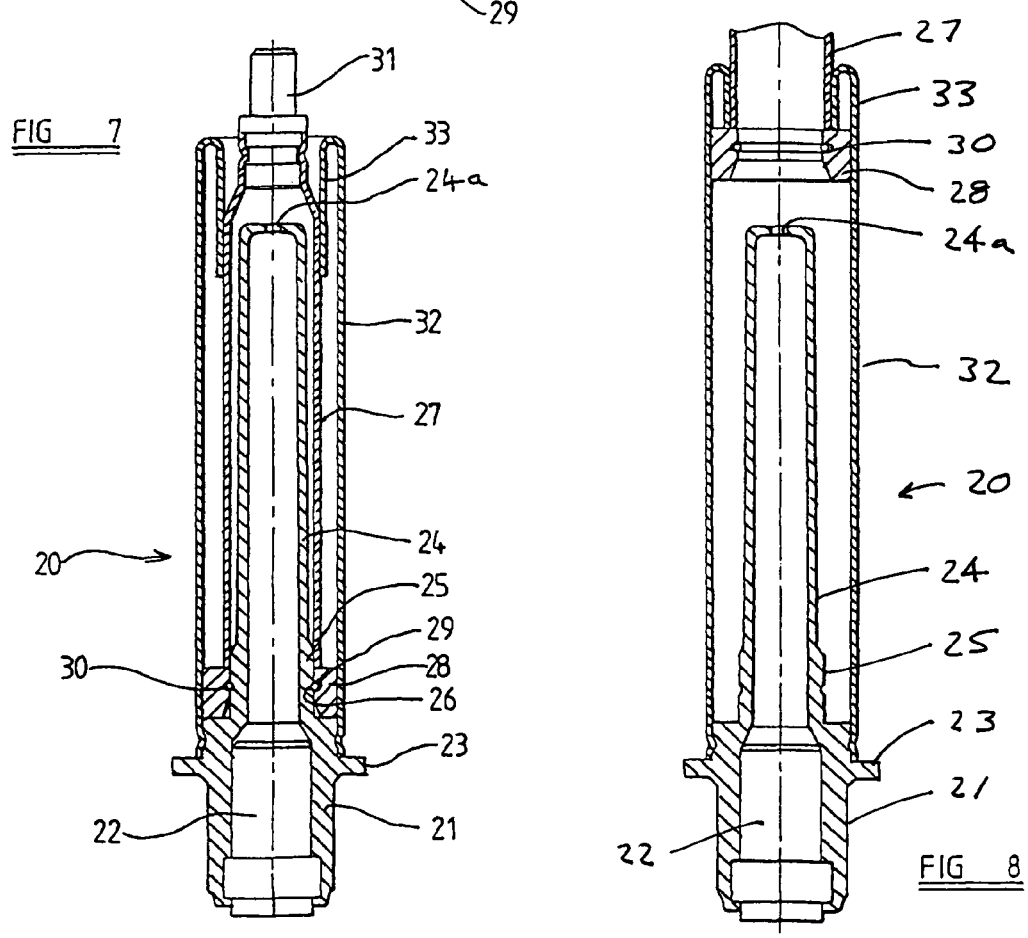
FIG 7
FIG 8

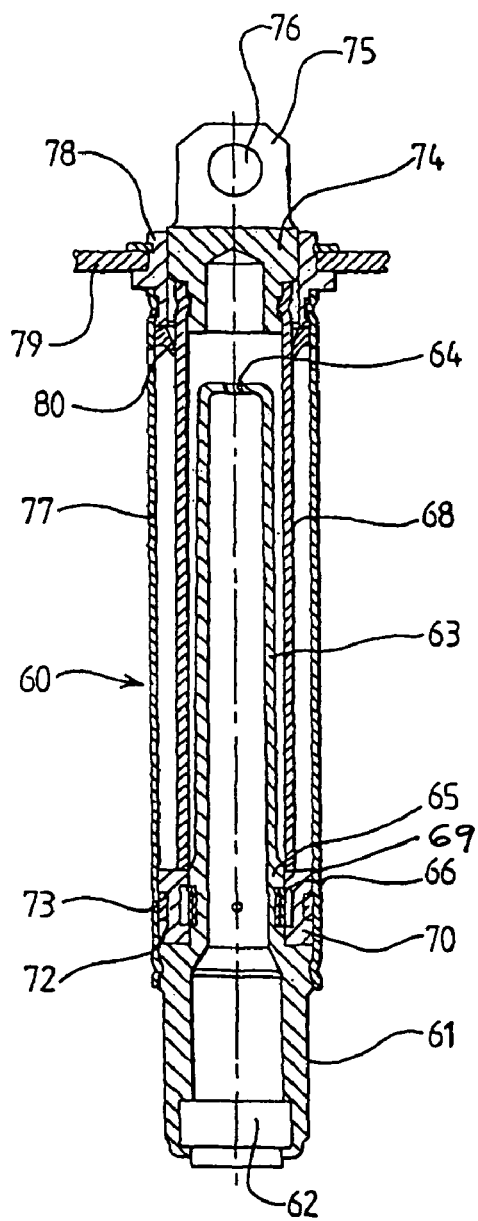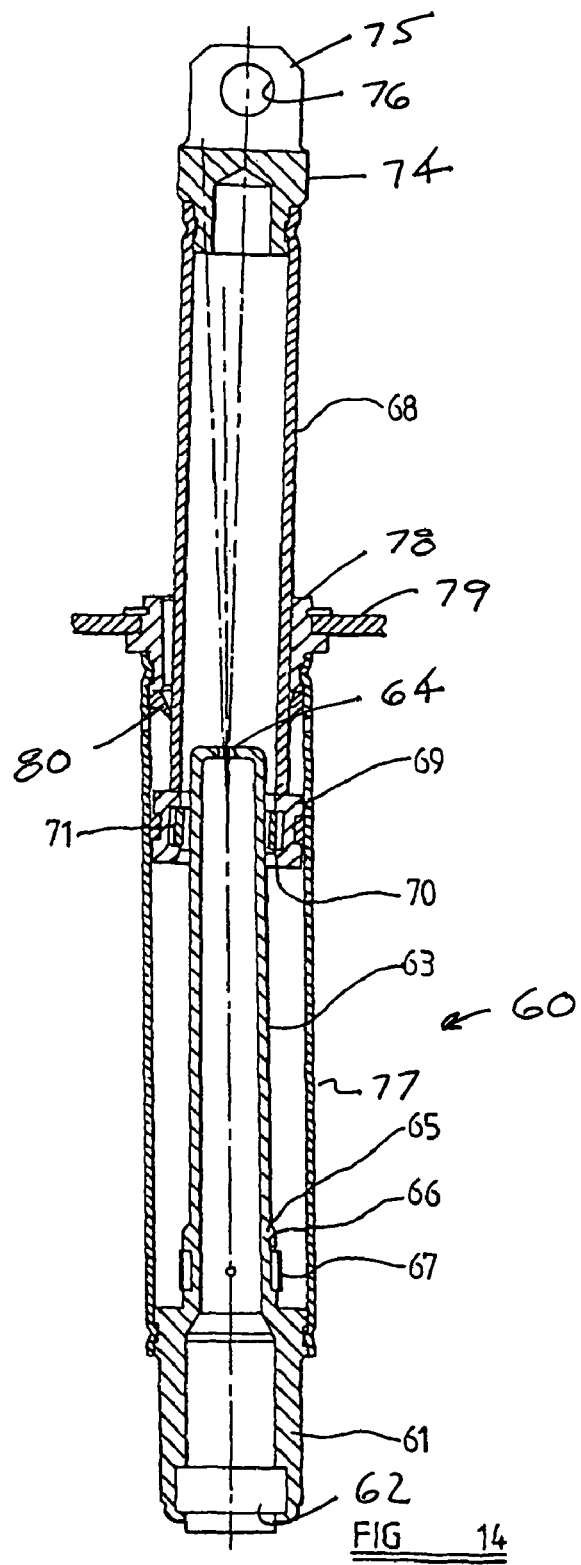
FIG 13
FIG 14

SAFETY ARRANGEMENT

CROSS REFERENCE TO RELATED APPLICATION

This application claims priority to PCT/SE2003/001823, filed Nov. 26, 2003 and GB 0227809.1, filed Nov. 28, 2002.

FIELD OF THE INVENTION

The present invention relates to a safety arrangement and more particularly to a safety arrangement provided in a motor vehicle adapted to lift the rear part of the hood or bonnet of the vehicle in response to an impact or accident situation involving a pedestrian.

BACKGROUND OF THE INVENTION

It has been proposed to provide a safety arrangement adapted to raise the rear part of the hood or bonnet of the motor vehicle in the event that an accident should occur in which a pedestrian is involved. The reason for lifting the rear part of the hood or bonnet is that, with the rear part of the hood or bonnet lifted, the entire bonnet is spaced from the underlying engine. The hood or bonnet may thus deform, whilst decelerating the body or head of the pedestrian, thus giving the head or body of the pedestrian a relatively slow deceleration. If the hood or bonnet were not lifted and the hood or bonnet deformed downwardly by even a short distance due to an impact with a pedestrian, that downward movement would soon terminate when the underside of the hood or bonnet impacted with the underlying engine, thus very rapidly decelerating the pedestrian with possible injury consequences.

Various proposals have been put forward as to mechanisms to achieve this objective, but it has been found difficult to provide a mechanism dimensioned to be located beneath the hood or bonnet, but which is capable of providing a sufficient degree of lift. The present invention seeks to provide an improved safety arrangement.

SUMMARY OF THE INVENTION

According to one aspect of this invention there is provided a lifting unit for lifting the rear part of a hood or bonnet. The lifting unit comprises a hollow cylindrical guide and at least one piston moveable relative to the hollow cylindrical guide and the piston being of hollow cylindrical form.

Preferably the unit incorporates two pistons each moveable relative to the guide and each moveable relative to the other piston.

Advantageously both of the pistons are of hollow cylindrical form. The two pistons are telescopically inter-engaged and the innermost piston telescopically engaging the cylindrical guide.

Alternatively the unit incorporates one cylindrical piston moveable relative to the guide and one piston comprising a piston head and a piston rod moveable relative to the cylindrical piston.

Preferably the piston rod is connected to the piston head by a yieldable coupling to enable the piston rod to be deflected from an initial axis of movement of the piston.

Alternatively the piston head is provided with a peripheral resilient sealing ring to facilitate deflection of the piston rod from an initial axis of movement of the piston rod.

In a further embodiment of the invention, the lifting unit defines an inner guide cylinder and an outer cylindrical guide sleeve. A cylindrical piston is located between the inner guide cylinder and the outer guide sleeve.

Preferably an outer part of the inner guide sleeve defines a groove and an inner part of the cylindrical piston defines a groove. The grooves are co-aligned when the piston is an initial condition relative to the guide cylinder and a releasable element is contained within the co-aligned grooves to retain the piston in the initial condition.

Conveniently the outer guide sleeve is provided with a re-entrant top portion configured to engage a piston head provided on the cylindrical piston.

According to another aspect of this invention there is provided a lifting unit for lifting part of a hood or bonnet. The lifting unit comprises a plurality of with at least one element being moveable relative to another element along a predetermined axis. The lifting unit is mounted or configured so that when the lifting unit is actuated, at least part of the lifting unit may deviate from the axis to facilitate the effecting of a virtual pivoting movement of the rear part of a hood or bonnet.

Preferably the entire lifting unit is mounted to be tilted from an initial position.

Conveniently the lifting unit is mounted with an abutment face present on the lifting unit engaging a resilient element mounted on a support. The resilient element is configured to be deformed to permit the tilting.

Advantageously the lifting unit comprises a plurality of elements. At least one element is moveable relative to another element along a predetermined axis, at least one part of the unit being yieldable to enable one element to be deflected from said axis on deployment of the lifting element.

Preferably the lifting element incorporates a piston having a piston head and a piston rod. The piston rod is connected to the piston head with a yieldable coupling so that the piston rod may become deflected from the axis of movement of the piston.

Conveniently the piston rod has a relatively narrow portion which passes through an aperture formed in part of the piston head. A resilient washer is trapped adjacent the piston head by a flange provided on the piston rod.

In an alternative embodiment, a piston is provided with a resilient sealing washer capable of deforming to permit one element of the lifting unit to become inclined.

Advantageously a piston is provided with a mounting lug provided with an aperture to receive a pivot pin.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 1 is a perspective view of a lifting unit in accordance with the present invention;

FIG. 2 is a side view of the lifting unit of FIG. 1;

FIG. 3 is a plan view of a gas generator housing for use with the unit of FIG. 2;

FIG. 4 is a sectional view of the unit of FIG. 2 and the associated gas generator housing in an initial position;

FIG. 5 is a view generally corresponding to FIG. 4, but taken from the opposite side, showing the unit of FIGS. 1 to 4 after deployment;

FIG. 6 is an exploded view of some of the components of an alternative embodiment of the invention;

FIG. 7 is a sectional view of the alternative embodiment of the invention prior to deployment;

FIG. 8 is a view corresponding to FIG. 7 illustrating the unit of FIG. 6 following deployment;

FIG. 13 is a sectional view of another embodiment prior to deployment;

FIG. 14 is a view of the embodiment of FIG. 12 following deployment;

DETAILED DESCRIPTION OF THE INVENTION

Figure 9:
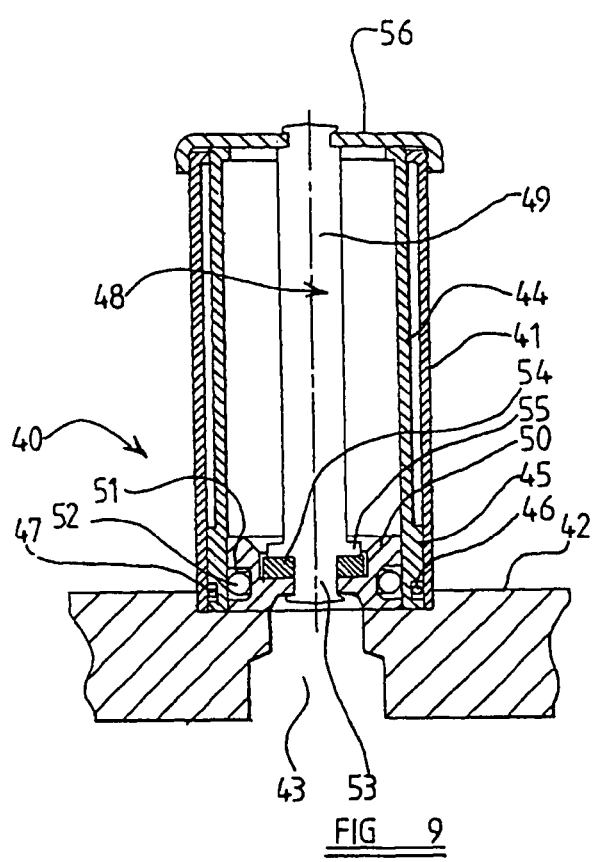
FIG. 9 is a sectional view of a further embodiment of the invention prior to deployment.

Referring initially to FIGS. 1 to 5 of the accompanying drawings, a lifting unit 1 is illustrated. The lifting unit includes an inner hollow cylindrical guide 2. The guide 2 is provided, at its lower end, with a projecting neck 3. The neck 3 is adapted to be inserted into a recess 4 contained within a housing 5. The housing 5 defines a second recess 6 adapted to receive a gas generator. The neck 3 is provided with a gas inlet aperture 7 so that the gas from the gas generator may flow into the interior of the cylindrical guide 2 that is associated with the neck 3.

The upper end of the cylindrical guide 2 is partially sealed by an upper cap 8. The upper cap 8 is provided with a central gas flow passage 9 therethrough. The outer periphery of the upper cap 8 is provided with a groove 10 containing a sealing ring 11. The sealing ring 11 engages the interior of a first inner hollow moveable cylinder 12, the moveable cylinder 12 telescopically receiving almost the whole of the inner cylinder 2.

The first moveable cylinder 12 has its own upper cap 13 which defines a central gas flow passage 14 and which itself has an outer circumferential groove 15 which contains a sealing ring 16. The sealing ring 16 sealingly engages the interior of a second hollow outer moveable cylinder 17. The upper cap 13 of the first moveable cylinder 12 has a depending circumferential skirt which closely embraces the upper part of the first moveable cylinder 12. The second moveable cylinder 17 telescopically receives the combination of the inner cylinder 2 and the first moveable cylinder 12. The second moveable cylinder 17 is provided with an end sealing cap 18, the end sealing cap 18 having a central projection 19.

The entire unit 1 is relatively compact and may readily be mounted in position beneath the rear part of the hood or bonnet of a motor vehicle.

It is to be understood that, should an accident arise involving an impact of the vehicle with a pedestrian, gas will be generated and will flow through the apertures 7 into the neck 3 and thus into the hollow interior of the cylindrical guide 2. It will be possible to achieve a substantial flow rate of gas since the gas will not initially be fed into an extremely small chamber, but instead will be fed into the entire hollow interior of the cylindrical guide 2. Gas will flow through the outlet port 9 provided in the sealing closure 8, and will cause the first moveable cylinder 12 and the outer moveable cylinder 17 to move axially. The cylinders are guided, one on the other and the first moveable cylinder 12 is guided on the inner cylindrical guide 2. The entire combination of cylinders will expand telescopically to have a substantial length as shown in FIG. 5.

It can be seen that because there are two moveable hollow cylinders 12 and 17, each of which has a length substantially equal to that of the inner cylindrical guide 2, a total "lift" can be achieved which is equal to approximately twice the initial height of the unit 1.

Once the cylinders have "lifted" to the configuration shown in FIG. 5, there is a certain "play" between the interconnection of the adjacent cylinders enabling the uppermost tube 17 to tilt about the axis defined by the innermost guide cylinder 2. This may be of substantial benefit since the rear part of a hood or bonnet, when lifted by the lifting unit, will effect a virtual pivotal movement about the retaining catch provided at the front of the hood or bonnet.

Referring now to FIGS. 6 to 8 in an alternative embodiment of the invention, a lifting unit 20 is provided with a housing 21 defining a chamber or cavity 22 to receive a gas generator. The housing 21 is provided with a peripheral mounting flange 23 and is also provided with an axially extending inner hollow guide cylinder 24. The inner guide cylinder 24 terminates with a closed end provided with a gas outlet aperture 24a. The portion of the inner guide cylinder 24 adjacent the chamber 22 containing the gas generator is thickened at 25, and the thickened portion 25 is provided with an outer peripheral semicircular groove 26.

A hollow cylindrical piston 27 is provided which surrounds the inner guide cylinder 24. One end of the piston 27, adjacent to the thickened portion 25 of the inner guide cylinder 24, is provided with a piston head 28. The piston head 28 is of annular form and in an initial position surrounds the thickened portion 25 of the inner guide cylinder 24, and is provided with an internal semicircular groove 29 which is in alignment with the semicircular groove 26 provided in the thickened portion 25. A "C" clip 30 is retained within the co-aligned grooves, thus holding the cylindrical piston 27 in a predetermined initial condition relative to the inner guide cylinder 24.

The upper end of the cylindrical piston 27 is sealed by means of a sealing plug 31. The sealing plug 31 may be configured to be biased against the underside of a hood or bonnet or may be configured to define a pivot axis on which part of the hood or bonnet may be pivotally mounted.

The housing 21 carries an outer hollow cylindrical guide sleeve 32. The outer guide sleeve 32 extends upwardly from above the mounting flange 23 so as to telescopically receive the cylindrical piston 27 and the inner guide cylinder 24. The outer guide sleeve 32 is formed of a deformable material and has, at its upper end, an inwardly folded re-entrant portion 33 which contacts the outermost part of the upper region of the cylindrical piston 27. The piston head 28 of the cylindrical piston 27 is a sliding sealing fit within the outer guide sleeve 32.

Upon actuation of the gas generator the hollow cylindrical piston 27 moves upwardly. The gas flows through the hollow interior of the inner guide cylinder 24 and through the gas outlet aperture 24a into the interior of the cylindrical piston 27. As the piston 27 moves upwardly, the piston 27 becomes disengaged from the guide cylinder 24. The piston head 28 is a sliding sealing fit within the guide sleeve 32, the continued generation of gas continues to force the piston 27 upwardly. The piston head 28 then engages the lower end of the re-entrant portion 33 of the guide sleeve 32. This re-entrant portion 33 is then deformed, thus absorbing energy and terminating the upward movement of the cylindrical piston 27. The unit 20 then has the condition shown in FIG. 8.

Figure 10:
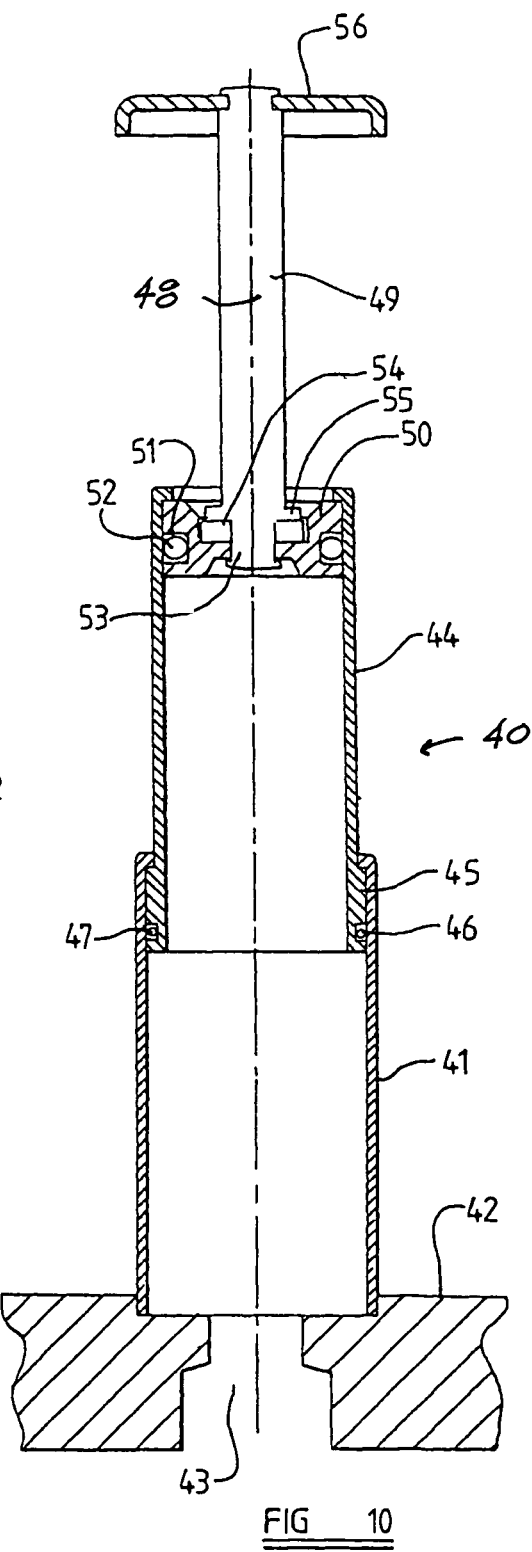
FIG. 10 is a sectional view of the embodiment of FIG. 8 following deployment.

FIGS. 9 and 10 illustrate another embodiment of the invention in which a lifting unit 40 comprises an outer cylindrical guide 41 of uniform cross-section with, at its upper end, an inwardly directed lip. The guide 41 is provided, at its base, with a housing 42. The housing 42 defines a chamber or cavity 43 to receive a gas generator. The gas generator is configured to direct gas into the interior of the guide 41. Contained within the guide 41 is a hollow cylindrical piston 44. The piston 44 is generally of uniform section, and is provided at its upper end with an inwardly directed lip. The piston 44 is provided with a piston head 45 adjacent to the housing 42. Piston head 45 defines an outer peripheral groove 46 which receives a sealing ring 47. The sealing ring 47 effects a substantially sealing sliding fit within the outer cylindrical guide 41.

Contained within the inner cylindrical piston 44 is a piston unit 48. The piston unit 48 has a piston rod 49 carrying, at its lower end, a piston head 50. The piston head 50 is provided with a peripheral and inner groove 51 containing a sealing ring 52 which engages the interior of the cylindrical piston 44. The piston rod has a relatively narrow portion 53 above the lower terminal end of the piston rod. The narrow portion 53 extends through a corresponding aperture formed in a web constituting a central part of the piston head 50, and also through a resilient washer 54 above the web. The piston rod 49 has enlarged flange 55 which abuts the upper surface of the washer 54. Thus, the washer 54 and the web of the piston head are trapped between the flange 55 and the end of the piston rod 49.

The uppermost end of the piston rod is engaged with an end cap 56 which initially covers the uppermost ends of the cylindrical guide 41 and cylindrical piston 44.

When gas is generated by a gas generator within the cavity 43 the piston head 50 of the piston unit 48 moves upwardly until it engages the lip at the uppermost end of the cylindrical piston 44. The cylindrical piston 44 also moves upwardly until the piston head 45 on the cylindrical piston 44 engages the lip at the uppermost end of the outer guide 41. The lifting unit is then fully extended, as shown in FIG. 10.

It is to be appreciated that the piston rod 49 may be deflected slightly from its initial axis due to the presence of the resilient washer 54 between the flange 55 on the piston rod 49, and at the adjacent web forming part of the piston head 50. This may facilitate the opening of the rear part of the hood or bonnet since, when the rear part of the hood or bonnet is lifted, the rear part exhibits a virtual pivotal motion about the fastening catch provided at the front of the hood or bonnet.

Figures 11, 12:
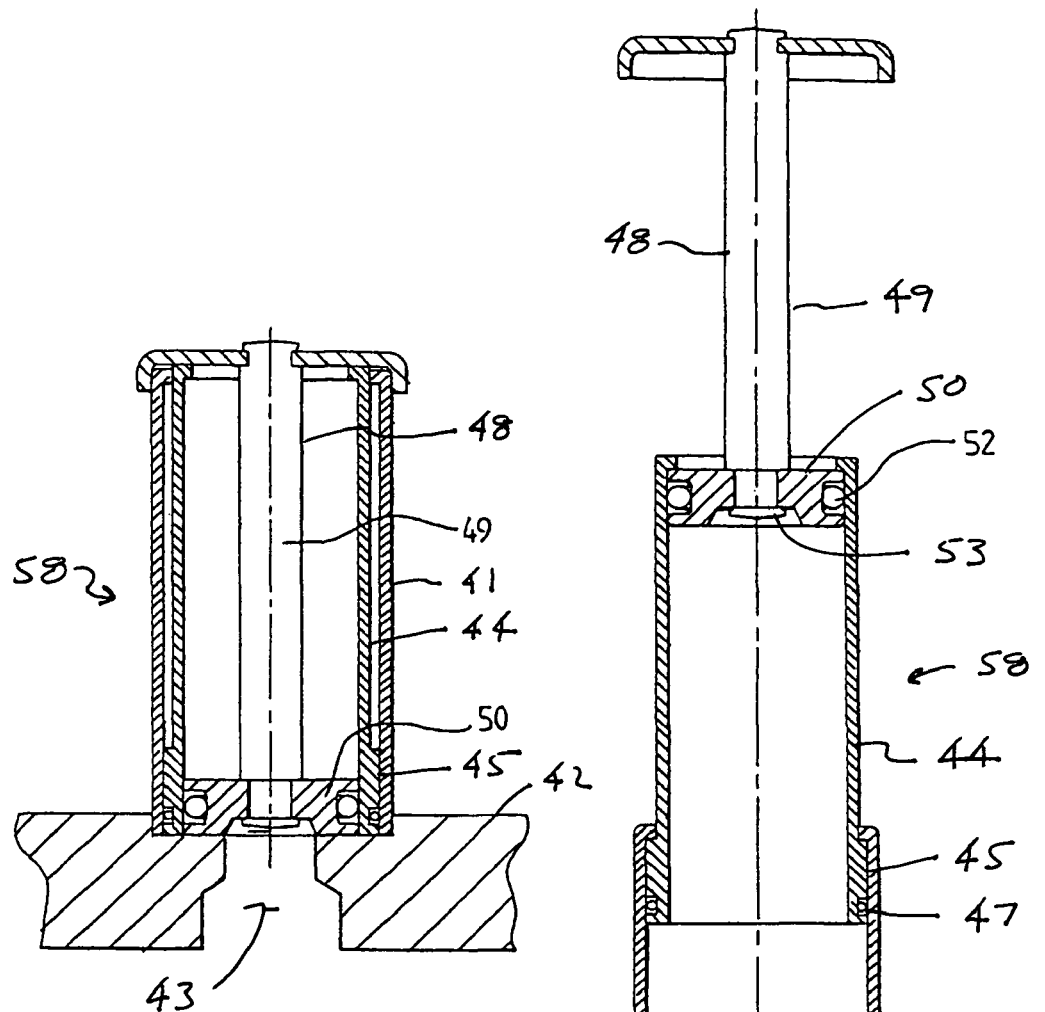
FIG. 11 is a view of yet another embodiment of the invention prior to deployment.
FIG. 12 is a view corresponding to FIG. 10 showing the embodiment of FIG. 10 following deployment.

FIGS. 11 and 12 illustrate an embodiment of the lifting unit 58 in accordance with this invention which is very similar to that described with reference to FIGS. 9 and 10, but in this embodiment the piston rod 49 is securely connected to the piston head 50. Other features of the embodiment of FIGS. 11 and 12 are the same as described above with reference to FIGS. 9 and 10. The operation of the unit is the same as that described with reference to FIGS. 9 and 10, but it is to be appreciated that when the conventional piston 48 is in the full extended position, the piston rod 49 may tilt about an axis defined in the region of the piston head due to a slight flexibility provided by the sealing ring 52. This again facilitates a virtual pivotal movement of the uppermost part of the piston.

Figure 15:
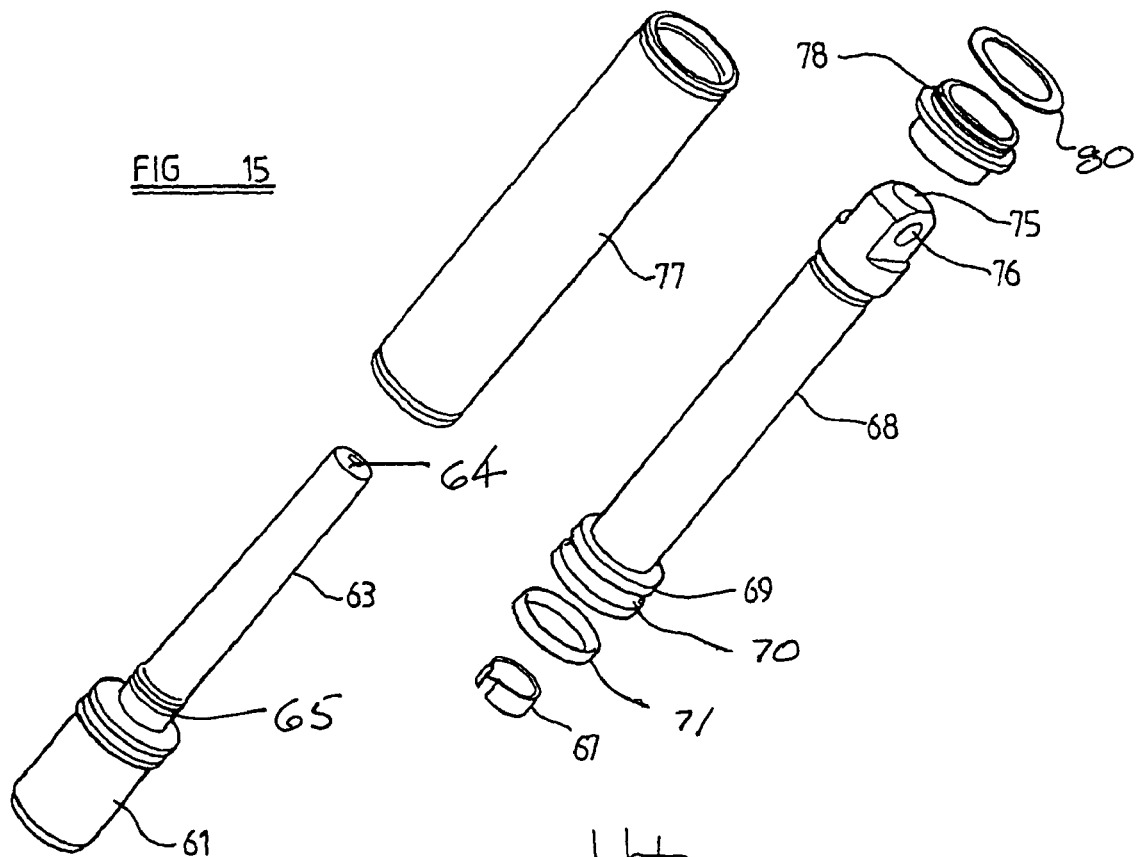
FIG. 15 is an enlarged perspective view of components of the embodiment of FIGS. 13 and 14.

FIGS. 13 and 15 illustrate a further embodiment of the invention. FIG. 13 illustrates a lifting unit 60 in its initial condition. The lifting unit 60 incorporates a housing 61 defining a chamber 62 to receive a gas generator.

The upper part of the housing 61 supports an inner hollow guide cylinder 63. The upper end of the guide cylinder 63 defines a gas outlet port 64. The base of the guide cylinder 63 is provided with a thickened region 65 adjacent the housing 61. An annular peripheral groove 66 is provided and formed in the thickened region 65. The groove 66 contains a "C" clip 67.

A hollow cylindrical piston 68 is provided which is engaged telescopically with the guide cylinder 63. The lowermost end of the cylindrical piston 68 is provided with a piston head 69. The piston head 69 is provided with an inner annular groove 70 in a form corresponding to that of the annular groove 66 formed in the thickened base region 65 of the hollow inner cylindrical guide 63. Contained within the groove is a resilient annular ring 71.

The annular piston head 69 is also provided with a peripheral groove 72 provided in its radially outermost face. The peripheral groove 72 containing a sealing ring 73.

The upper end of the cylindrical piston 68 is provided with a plug 74. The plug 74 is provided, at its outer end, with an upstanding lug 75. The lug 75 defines a through-bore 76 dimensioned to receive a pivot pin. Part of the hood or bonnet may be pivotally mounted on the pivot pin.

The housing 61 carries a hollow cylindrical outer guide sleeve 77. The lowermost end of the guide sleeve 77 is crimped to the housing 61. The piston head 69 of the cylindrical piston 68 is a sliding sealing fit within the guide sleeve 77. The upper end of the guide sleeve 77 is crimped to a annular mounting ring 78. The mounting ring 78 may be used to mount the lifting unit 60 to an aperture formed in a support plate 79 forming part of the vehicle. A wiper seal 80 may be provided at the upper end of the guide sleeve 77 adjacent the mounting ring 78. The wiper seal 80 engages the outer surface of the cylindrical piston 68.

It is to be appreciated that the cylindrical piston 68 in an initial position as shown in FIG. 13, with the combination of the "C" clip 67 and the annular ring 71 in the co-aligned annular grooves 66 in a thickened portion 65 at the base of the inner cylindrical guide 63 and 70 formed in the inner face of the piston head 69, serve to retain the cylindrical piston 68 firmly in an initial position. Thus the apertured lug 75 can provide a firm pivot point for the rear part of the hood or bonnet.

Upon actuation of the lifting unit, gas is supplied from the gas generator through the hollow cylindrical guide 63 to the interior of the cylindrical piston. The cylindrical piston 68 thus moves axially, lifting the lug 75.

When the cylindrical piston 68 has been lifted, it is possible for the axis of the cylindrical piston 68 to deviate from the axis of the cylindrical guide 63 and the cylindrical sleeve 77. This enables a hood or bonnet to effect a virtual pivoting motion about a front fastening catch.

Figure 16:
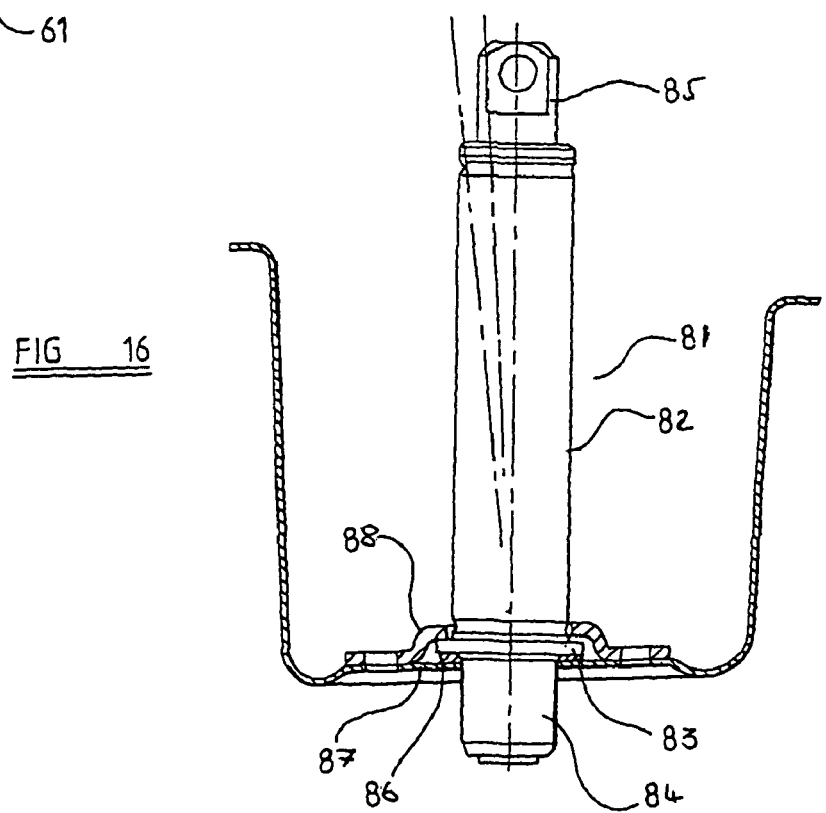
FIG. 16 is a side elevational and part sectional view of another embodiment of the invention.

FIG. 16 illustrates a further embodiment of the invention in which a lifting unit 81, which may be a lifting unit having the same internal design as that of the lifting unit 60, is mounted in position so that the entire lifting unit may tilt or pivot from an initial vertical position. Lifting unit 81 is provided with an outer cylindrical guide 82, and carries at its lower end, an outwardly directed mounting flange 83. Beneath the mounting flange 83, a housing 84 is provided to contain a gas generator.

The upper end of the lifting unit is provided with an apertured lug 85.

The flange 83 rests on top of an annular resilient ring 86 resting on a support 87, and is held in position by means of an annular retainer ring 88 which has an inwardly directed lip which extends inwardly over the flange 83. It is to be appreciated that the lifting unit 81 may effect a tilting or pivoting movement about an initial upright position so that the unit deviates from its initial position with part of the resilient ring 86 beneath the flange 83 being consequently compressed. This again facilitates a virtual pivoting movement of the hood or bonnet being lifted by the lifting unit.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A lifting unit for lifting the rear part of a hood or bonnet, the lifting unit comprising an inner hollow cylindrical guide and an outer hollow cylindrical guide and at least one piston moveable relative to the inner and outer hollow cylindrical guides, the piston being of hollow cylindrical form and being located between the inner hollow cylindrical guide and the outer hollow cylindrical guide, wherein an outer part of the inner hollow cylindrical guide defines a first groove and an inner part of the piston defines a second groove, the first and second grooves being immediately adjacent to each other and co-aligned to form a channel when the piston is in an initial condition relative to the inner hollow cylindrical guide, there being a releasable element contained within the channel to retain the piston in the initial condition.

2. A lifting unit according to claim 1 wherein the outer hollow cylindrical guide is provided with a re-entrant top portion configured to engage a piston head provided on the piston.

3. A lifting unit for lifting a rear part of a hood or bonnet of a vehicle, the lifting unit comprising an outer cylinder mounted on a support and a piston that includes a piston head slideable in the outer cylinder and a part which extends from the outer cylinder, the piston connected with the rear part of the hood or bonnet and moveable relative to the outer cylinder along a predetermined axis defined by the outer cylinder to lift the rear part of the hood or bonnet, the outer cylinder includes an outwardly directed mounting flange resting on top of a resilient ring, which rests on the support, the flange being held in position by a retainer ring which has an inwardly directed lip which extends inwardly over the flange, wherein the resilient ring is configured to be deformed as the piston is moved relative to the outer cylinder to lift the rear part of the hood or bonnet, permitting the entire lifting unit to tilt relative to the support for facilitating imparting a virtual pivoting movement to the rear part of the hood or bonnet.

4. A lifting unit according to claim 3, further comprising a housing defining a chamber for receiving a gas generator, an upper part of the housing supporting a hollow inner guide cylinder with a gas outlet port at a lower end of the hollow inner guide cylinder, a lowermost end of the outer cylinder being secured to the housing, the piston being hollow to receive the hollow inner guide cylinder in a contracted condition of the lifting unit and a lower most end of the piston being provided with the piston head sealingly engaging the outer cylinder, and wherein an outer part of the hollow inner guide cylinder provides a groove and an inner part of the piston provides a groove being co-aligned when the piston is in an initial condition relative to the hollow inner guide cylinder, there being a releasable element contained within the co-aligned grooves to retain the piston in the initial condition.

5. The lifting arrangement according to claim 3 wherein the piston is provided with a mounting lug having an aperture for receiving a pivot pin.

6. A lifting unit for lifting a rear part of a hood or bonnet of a vehicle, the lifting unit comprising an inner hollow cylindrical guide and an outer hollow cylindrical guide mounted on a support and a piston located between the inner and outer hollow cylindrical guides, the piston connected with the rear part of the hood or bonnet and moveable relative to the inner and outer hollow cylindrical guides along a predetermined axis defined by the inner and outer hollow cylindrical guides to lift the rear part of the hood or bonnet, wherein an outer part of the inner hollow cylindrical guide defines a first groove and an inner part of the piston defines a second groove, the first and second grooves being co-aligned when the piston is in an initial condition relative to the inner hollow cylindrical guide, there being a releasable element contained within the first and second grooves to retain the piston in the initial condition, wherein the outer hollow cylindrical guide includes a mounting flange, and wherein the inner and outer hollow cylindrical guides have an abutment face provided by the mounting flange, the inner and outer cylindrical guides being mounted with the abutment face engaging a resilient element mounted on the support, the resilient element being configured to be deformed as the piston is moved relative to the inner and outer hollow cylindrical guides to lift the rear part of the hood or bonnet, permitting the entire lifting unit to tilt relative to the support for facilitating imparting a virtual pivoting movement to the rear part of the hood or bonnet.

7. A lifting unit for lifting a rear part of a hood or bonnet of a vehicle, the lifting unit comprising an inner hollow cylindrical guide and an outer hollow cylindrical guide mounted on a support and a piston located between the inner and outer hollow cylindrical guides, the piston connected with the rear part of the hood or bonnet and moveable relative to the inner and outer hollow cylindrical guides along a predetermined axis defined by the inner and outer hollow cylindrical guides to lift the rear part of the hood or bonnet, the outer hollow cylindrical guide is being provided with a re-entrant top portion configured to engage a piston head provided on the piston, wherein the outer hollow cylindrical guide includes a mounting flange, wherein the inner and outer hollow cylindrical guides have an abutment face provided by the mounting flange, the inner and outer cylindrical guides being mounted with the abutment face engaging a resilient element mounted on the support, the resilient element being configured to be deformed as the piston is moved relative to the inner and outer hollow cylindrical guides to lift the rear part of the hood or bonnet, permitting the entire lifting unit to tilt relative to the support for facilitating imparting a virtual pivoting movement to the rear part of the hood or bonnet.

8. A lifting unit according to claim 3 wherein the piston is moved relative to the outer cylinder to lift the rear part of the hood or bonnet on deployment of the lifting unit via gas produced from a gas generator, which is in fluid communication with the lifting unit.

9. A lifting unit according to claim 6 wherein the piston is moved relative to the inner and outer hollow cylindrical guides to lift the rear part of the hood or bonnet on deployment of the lifting unit via gas produced from a gas generator, which is in fluid communication with the lifting unit.

10. A lifting unit according to claim 7 wherein the piston is moved relative to the inner and outer hollow cylindrical guides to lift the rear part of the hood or bonnet on deployment of the lifting unit via gas produced from a gas generator, which is in fluid communication with the lifting unit.

* * * * *